United States Patent
Bang et al.

(10) Patent No.: US 12,533,661 B2
(45) Date of Patent: Jan. 27, 2026

(54) CATALYST FOR OXYCHLORINATION PROCESS OF HYDROCARBON, METHOD FOR PRODUCING SAME, AND METHOD FOR MANUFACTURING OXYCHLORINATED COMPOUND OF HYDROCARBON BY USING SAME

(71) Applicants: LG CHEM, LTD., Seoul (KR); SEOUL NATIONAL UNIVERSITY R&DB FOUNDATION, Seoul (KR)

(72) Inventors: Jungup Bang, Daejeon (KR); Do Heui Kim, Seoul (KR); Gyo Hyun Hwang, Daejeon (KR); Jongwook Jung, Daejeon (KR); Yongju Bang, Daejeon (KR); Youngseok Ryou, Daejeon (KR); Jeongeun Kim, Gunpo-si (KR)

(73) Assignees: LG CHEM, LTD., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 41 days.

(21) Appl. No.: 16/958,385

(22) PCT Filed: Feb. 22, 2019

(86) PCT No.: PCT/KR2019/002235
§ 371 (c)(1),
(2) Date: Jun. 26, 2020

(87) PCT Pub. No.: WO2019/164345
PCT Pub. Date: Aug. 29, 2019

(65) Prior Publication Data
US 2021/0086168 A1  Mar. 25, 2021

(30) Foreign Application Priority Data
Feb. 23, 2018 (KR) ..................... 10-2018-0022207

(51) Int. Cl.
*B01J 23/78* (2006.01)
*B01J 23/83* (2006.01)
(Continued)

(52) U.S. Cl.
CPC ............... *B01J 23/78* (2013.01); *B01J 23/83* (2013.01); *B01J 35/40* (2024.01); *B01J 35/61* (2024.01); *B01J 37/02* (2013.01); *B01J 2235/15* (2024.01)

(58) Field of Classification Search
None
See application file for complete search history.

(56) References Cited

U.S. PATENT DOCUMENTS

| 4,159,968 A | 7/1979 | Kroenke et al. |
| 5,192,733 A | 3/1993 | Mainz et al. |

(Continued)

FOREIGN PATENT DOCUMENTS

| CN | 101663258 A | 3/2010 |
| CN | 102344339 B | 3/2015 |

(Continued)

OTHER PUBLICATIONS

Bera et al., Studies on Cu/CeO2: A new NO Reduction Catalyst, Journal of Catalysis, 186, 36-44, 1999 (Year: 1999).*

(Continued)

*Primary Examiner* — Keling Zhang
(74) *Attorney, Agent, or Firm* — Birch, Stewart, Kolasch & Birch, LLP (57) ABSTRACT

A catalyst for an oxychlorination process of hydrocarbons, a preparation method thereof, and a method for preparing an oxychlorination compound of hydrocarbons using the same.

12 Claims, 6 Drawing Sheets

(51) Int. Cl.
  *B01J 35/40* (2024.01)
  *B01J 35/61* (2024.01)
  *B01J 37/02* (2006.01)

(56) References Cited

U.S. PATENT DOCUMENTS

| | | | |
|---|---|---|---|
| 5,928,619 A * | 7/1999 | Bonneau | C01G 53/006 |
| | | | 423/263 |
| 5,986,152 A | 11/1999 | Muller et al. | |
| 2002/0115563 A1 | 8/2002 | Blanchard et al. | |
| 2009/0170689 A1 * | 7/2009 | Hatanaka | B01D 53/945 |
| | | | 423/239.1 |
| 2011/0020201 A1 | 1/2011 | Luo et al. | |

FOREIGN PATENT DOCUMENTS

| | | |
|---|---|---|
| EP | 3 272 418 A1 | 1/2018 |
| GB | 958458 A | 5/1964 |
| GB | 1 460 762 A | 1/1977 |
| JP | 6-211525 A | 8/1994 |
| JP | 2003-334448 A | 11/2003 |
| JP | 2016-19955 A | 2/2016 |
| KR | 10-1999-0045511 A | 6/1999 |
| KR | 10-2000-0057428 A | 3/2000 |
| KR | 10-2007-0079875 A | 8/2007 |
| KR | 10-2008-0037500 A | 5/2008 |
| KR | 10-2012-0040718 A | 4/2012 |
| WO | WO 2009/031719 A1 | 3/2009 |
| WO | WO 2017/216653 A1 | 12/2017 |

OTHER PUBLICATIONS

Santos et al., Measurements of the effective diffusivity for a vanadia-tungsta-titania/sepiolite catalyst for SCR of NOx, Applied Catalysis B: Environmental, Aug. 1996, 299-314 (Year: 1996).*
Peck et al., Monolayer detection of supported Fe and Co oxides on ceria to establish structure—Activity relationships for reduction of NO by CO, The Journal of Physical Chemistry C, 2017, 121, 8435-8443 (Year: 2017).*
Ohtake et al., Hydrothermally synthesized ceria with a high specific surface area for catalytic conversion of ethanol to ethylene, Journal of Chemical Engineering of Japan, 2016 (Year: 2016).*
Hu et al., Mechanistic aspects of deNOx processing over TiO2 supported Co—Mn oxide catalysis: structure-activity relationships and in situ DRIFT analysis, ACS Catal., 2015 (Year: 2015).*
International Search Report (PCT/ISA/210) issued in PCT/KR2019/002235 mailed on May 24, 2019.
Scharfe et al., "Mechanism of Ethylene Oxychlorination on Ceria", ACS Catalysis, 2018, vol. 8, No. 4, pp. 2651-2663, Total 43 pages.
Zhou et al., "The role of KCl in $FeCl_3$-$KCl/Al_2O_3$ catalysts with enhanced catalytic performance for ethane oxychlorination", Dalton Transactions, 2017, vol. 46, No. 31, pp. 10433-10439, Total 8 pages.
Qihua, "Study on the Auxiliary Effect and Support Effect of Ferric Chloride-Based Ethane Oxychlorination Catalyst", Mongolian University, Apr. 19, 2017, 16 pages, with an English translation.
European Communication pursuant to Article 94(3) EPC for European Application No. 19 758 269.5, dated Mar. 30, 2023.
Lampaiah et al., "Fe-doped $CeO_2$ nanorods for enhanced peroxidase-like activity and their application towards glucose detection," Journal of Materials Chemistry B, vol. 4, No. 22, 2016, pp. 3874-3885.

* cited by examiner

CATALYST FOR OXYCHLORINATION PROCESS OF HYDROCARBON, METHOD FOR PRODUCING SAME, AND METHOD FOR MANUFACTURING OXYCHLORINATED COMPOUND OF HYDROCARBON BY USING SAME

TECHNICAL FIELD

This application claims priority to and the benefit of Korean Patent Application No. 10-2018-0022207 filed in the Korean Intellectual Property Office on Feb. 23, 2018, the entire contents of which are incorporated herein by reference.

The present specification relates to a catalyst for an oxychlorination process of hydrocarbons, a preparation method thereof, and a method for preparing an oxychlorination compound of hydrocarbons using the same.

BACKGROUND ART

The importance on studies on the method of utilizing natural gas which is cheap and rich in reserves due to the continuous increase in oil prices has further increased, and the prior arts concerning pyrolysis reactions of methane in natural gas using oxygen and coupling reactions of methane in natural gas using a catalyst have been mainly reported. Further, as a method in the related art that may use a chlorine compound for the activation of methane, methods of pyrolyzing methane and chlorine at high temperature are disclosed in U.S. Pat. Nos. 4,199,533, 4,804,797, 4,714,796 and 4,983,783, and the like. However, since the high temperature pyrolysis of methane by chlorine depends on the amount of heat supplied and the reaction time, which are simply provided, in the control of selectivity, lots of byproducts such as methylene chloride or cokes are additionally generated.

PRIOR ART DOCUMENT

Patent Document (Patent Document 1) Korean Patent Application Laid-Open No. 10-2010-0074017

DETAILED DESCRIPTION OF INVENTION

Technical Problem

The present specification provides a catalyst for an oxychlorination process of hydrocarbons, a preparation method thereof, and a method for preparing an oxychlorination compound of hydrocarbons using the same.

Technical Solution

An exemplary embodiment of the present specification provides a catalyst for an oxychlorination process of hydrocarbons, the catalyst including: a catalyst material including iron (Fe); and a carrier including cerium oxide ($CeO_2$), in which a content of the catalyst material is 0.1 wt % to 9 wt % based on a total weight of the catalyst.

Further, an exemplary embodiment of the present specification provides a method for preparing the catalyst for an oxychlorination process of hydrocarbons, the method including: preparing a carrier including cerium oxide ($CeO_2$); and supporting a catalyst material including iron (Fe) on the carrier.

In addition, an exemplary embodiment of the present specification provides a method for preparing an oxychlorination compound of hydrocarbons, which is performed in the presence of the catalyst for an oxychlorination process of hydrocarbons and includes an oxychlorination reaction of hydrocarbons.

Advantageous Effects

The catalyst for an oxychlorination process of hydrocarbons according to an exemplary embodiment of the present specification has an effect in that it is possible to increase the selectivity of a target product when used in an oxychlorination process.

Further, the catalyst for an oxychlorination process of hydrocarbons according to an exemplary embodiment of the present specification has an effect in that it is possible to suppress the production of byproducts such as carbon monoxide or carbon dioxide when used for an oxychlorination process.

In addition, the catalyst for an oxychlorination process of hydrocarbons according to an exemplary embodiment of the present specification has an effect in that it is possible to increase the selectivity of a target product even at low temperature when used for an oxychlorination process.

BEST MODE

Hereinafter, the present specification will be described.

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element may be further included.

In the present specification, the "catalyst material" may be an "active material" having catalytic activity.

In the present specification, unless otherwise mentioned, the "catalyst" may be a catalyst for an oxychlorination process of hydrocarbons.

In the present specification, the "oxychlorination process of hydrocarbons" may mean a process for substituting hydrogen of hydrocarbons with chlorine, and may also be named an oxidative chlorination process of hydrocarbons. For example, the oxychlorination process of hydrocarbons may be a process of producing a chloromethane ($CH_3Cl$, $CH_2Cl_2$, or $CHCl_3$) by substituting hydrogen of a methane gas ($CH_4$) with chlorine, and may be represented by the following Formula (I). The chloromethane produced through the following General Formula (I) may be converted into a useful chemical product through the following General Formula (II). In the following General Formula (I), not only a chloromethane, but also a byproduct such as carbon monoxide or carbon dioxide may be produced.

$$CH_4 + HCl + O_2 \rightarrow Chloromethane + H_2O \quad (I)$$

$$Chloromethane \rightarrow Chemical\ product + HCl \quad (II)$$

The present specification has been made in an effort to provide a catalyst which is used for the process of General Formula (I) and may minimize the selectivity of byproducts such as carbon monoxide or carbon dioxide while increasing the selectivity of chloromethane in a product.

An exemplary embodiment of the present specification provides a catalyst for an oxychlorination process of hydrocarbons, the catalyst including: a catalyst material including iron (Fe); and a carrier including cerium oxide ($CeO_2$), in which a content of the catalyst material is 0.1 wt % to 9 wt % based on a total weight of the catalyst. In the catalyst for an oxychlorination process of hydrocarbons, the catalyst material includes iron, the content of the catalyst material is adjusted to a specific content, and the carrier includes cerium oxide, thereby improving the performance of the catalyst.

In an exemplary embodiment of the present specification, iron (Fe) is included in the catalyst material, thereby improving the performance of the catalyst. Specifically, in order to enhance the oxidation-reduction ability of the catalyst, the oxygen vacancy in the catalyst needs to be sufficiently secured. When iron is supported on the $CeO_2$ carrier, iron ions ($Fe^{3+}$) enrich the oxygen vacancy by the charge compensation mechanism, and accordingly, the oxidation-reduction ability of the catalyst is enhanced. Furthermore, iron is included in a catalyst material, so that there is an effect in that it is possible to reduce the selectivity of byproducts such as carbon monoxide or carbon dioxide which may be generated during the oxychlorination process of hydrocarbons.

The present specification may be used in a packed bed, fluidized bed, or circulating fluidized bed reactor by including cerium oxide as a carrier and including iron in a catalyst material in the preparation of a chloro compound through an oxychlorination reaction of hydrocarbons.

Further, the present specification has been made in an effort to maximally suppress the production of byproducts generated during the oxychlorination process of hydrocarbons and maximize the production of a target product by using the catalyst according to an exemplary embodiment of the present specification. For example, when a reactant is methane ($CH_4$) and the target products are $CH_3Cl$, $CH_2Cl_2$, and $CHCl_3$ which are chlorination compounds of methane, $CO_2$ and CO as byproducts are generated, and in this case, the present specification has been made in an effort to maximize the amount of chlorination methanes $CH_3Cl$, $CH_2Cl_2$, and $CHCl_3$ produced and minimize the generation of $CO_2$ and CO as byproducts. In this case, the present specification has been made in an effort to induce the reduction in process costs by increasing the amount of target product produced while suppressing a risk that may occur due to the process by minimizing the amount of harmful materials carbon dioxide and carbon monoxide generated.

In an exemplary embodiment of the present specification, in the catalyst for an oxychlorination process of hydrocarbons, the catalyst material including iron may be supported on the carrier including cerium oxide ($CeO_2$). The supporting method is not particularly limited as long as the method is generally used in the art to which the technology pertains, and a specific method thereof will be described below.

In an exemplary embodiment of the present specification, iron included in the catalyst material may be used as an active material. Specifically, iron is included in a catalyst material, so that there is an effect in that it is possible to reduce the selectivity of byproducts such as carbon monoxide or carbon dioxide which may be generated during the oxychlorination process of hydrocarbons.

In an exemplary embodiment of the present specification, the content of the catalyst material may be 0.1 wt % to 9 wt % based on the total weight of the catalyst. When the content of the catalyst material satisfies the numerical range, the function of the catalyst by the catalyst material may be efficiently performed, and there is an effect in that it is possible to suppress the non-activation phenomenon of the catalyst.

In an exemplary embodiment of the present specification, the content of the catalyst material may be 1 wt % to 7 wt % based on the total weight of the catalyst. When the content of the catalyst material satisfies the numerical range, the excellent performance of the catalyst may be maintained because the oxidation-reduction ability of the catalyst is enhanced. The content of the catalyst material means the degree to which the catalyst material is supported on a carrier.

In an exemplary embodiment of the present specification, the catalyst material may further include one or more components selected from the group consisting of yttria (Y), an alkali metal, an alkaline earth metal, a lanthanide metal, and a rare earth metal, in addition to the iron.

In an exemplary embodiment of the present specification, the alkali metal element means the other chemical elements except hydrogen in Group 1 of the Periodic Table, and may be lithium (Li), sodium (Na), potassium (K), rubidium (Rb), cesium (Cs), or francium (Fr).

In an exemplary embodiment of the present specification, the alkaline earth metal element means an element of Group 2 of the Periodic Table, and may be beryllium (Be), magnesium (Mg), calcium (Ca), strontium (Sr), barium (Ba), or radium (Ra).

In an exemplary embodiment of the present specification, the rare earth element may be scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or lutetium (Lu).

In an exemplary embodiment of the present specification, the content of the iron (Fe) may be 50 wt % to 100 wt %, preferably 90 wt % to 100 wt % based on the total weight of the catalyst material. For example, when only iron is used as the catalyst material, the content of iron may be 100 wt % based on the total weight of the catalyst material, and when iron and yttria are used as catalyst materials, the content of iron may be 50 wt % based on the total weight of the catalyst material.

In an exemplary embodiment of the present specification, the content of iron (Fe) may be 1 wt % to 7 wt %, preferably 1 wt % to 6 wt %, 2 wt % to 5 wt %, or 2.5 wt % to 4 wt %, or 3 wt % to 3.5 wt % based on the total weight of the catalyst. When iron (Fe) is included within the numerical range, the excellent oxidation-reduction ability of the catalyst may be maintained. As described above, when iron is supported on the $CeO_2$ carrier, iron ions ($Fe^{3+}$) enrich the oxygen vacancy by the charge compensation mechanism, and accordingly, the oxidation-reduction ability of the catalyst is enhanced. However, when a too large amount of iron is supported, iron ions occupying the interstitial site aggregate with one another. In this case, there may be a problem in that the oxygen vacancy is reduced by the interstitial compensation mechanism. However, when iron is included within the numerical range, the excellent oxidation-reduction ability of the catalyst may be maintained because it is possible to effectively suppress the production of byproducts and to prevent the aggregation of iron ions, as compared to a catalyst which does not include iron.

In an exemplary embodiment of the present specification, cerium oxide may be included in an amount of 50 wt % to 100 wt % based on the total weight of the carrier. When the content of cerium oxide satisfies the numerical range, the performance of the catalyst itself may be improved by cerium oxide because the content of cerium oxide included in the carrier is large.

In an exemplary embodiment of the present specification, the carrier may have a cerium oxide ($CeO_2$) single composition. The cerium oxide ($CeO_2$) single composition means that the carrier rarely includes materials other than cerium oxide, or includes a small amount of materials other than cerium oxide even though the carrier includes the materials. For example, the content of cerium oxide may be 80 wt % or more, 90 wt % or more, 95 wt % or more, or 99 wt % or more, and most preferably 100 wt %, based on the total 100 weight of the carrier.

It is possible to confirm, by a general method used in the art to which the technology pertains, that the carrier has a cerium oxide ($CeO_2$) single composition. For example, it is possible to confirm the presence or absence of $CeO_2$ by confirming X-ray diffraction peak patterns. Specifically, when peaks corresponding to (111), (200), (220), and (311) crystal planes are present, it is possible to confirm that $CeO_2$ on the cubic is present. Further, it is possible to confirm the presence or absence and wt % of Ce and O atoms by the energy dispersive spectroscopy (EDS) measurement. The EDS analysis is used to confirm the chemical composition of a sample along with SEM photographs. During the EDS measurement on cerium oxide, peaks corresponding to Ce and O atoms are observed. In contrast, when a peak of an atom other than Ce and O atoms is rarely observed, it is possible to confirm that the carrier has a cerium oxide single composition.

In an exemplary embodiment of the present specification, the carrier may be composed of only cerium oxide.

In an exemplary embodiment of the present specification, the carrier including cerium oxide ($CeO_2$) may be in the form of a powder, the powder may be in the form of a sphere, and the diameter of a catalyst including the carrier will be described below.

In an exemplary embodiment of the present specification, an "A-B-C/$CeO_2$ catalyst" may mean that A, B, and C as a metal or metal oxide are supported on a $CeO_2$ carrier.

In an exemplary embodiment of the present specification, the carrier may have a specific surface area of 50 $m^2$/g to 250 $m^2$/g, 100 $m^2$/g to 200 $m^2$/g, preferably 120 $m^2$/g to 150 $m^2$/g. When the specific surface area of the carries satisfies the numerical range, the contact area with an active component of the catalyst may be widely secured, and when an inlet gas is delivered into the catalyst, the material delivery resistance is appropriately controlled, so that the excellent conversion of the raw material gas may be achieved. The specific surface area of the carrier may mean the area ($m^2$) based on the total weight (g) of the carrier. The specific surface area of the carrier may be measured by a method generally used in the art, and may be measured, for example, by the Brunauer, Emmett and Teller (BET) method. The method is a type of a vapor adsorption method that adsorbs molecules or ions onto the surface of a carrier and measures the surface area from the amount of molecules or ions adsorbed, and after a sample is stored at 250° C. for 5 hours, the specific surface area may be measured by using an $N_2$ adsorption-desorption isotherm using the Micromeritics ASAP 2010 apparatus.

In an exemplary embodiment of the present specification, the carrier may further include a composite oxide including one or more elements selected from the group consisting of Zr, Y, an alkali metal element, an alkaline earth metal element, a lanthanide element, and a rare earth element. Specific examples on the alkali metal element, the alkaline earth metal element, the lanthanide element, and the rare earth element are the same as those described above.

In an exemplary embodiment of the present specification, examples of the composite oxide include a CeZr composite oxide (70:30), a CeZrLa composite oxide (86:10:4), a CeZrLa composite oxide (66:29:5), a CeZrLaY composite oxide (40:50:5:5), a CeZrPr composite oxide (40:55:5), a CeZrLaNdPr composite oxide, a CeZrNdPrCa composite oxide, or the like. The numbers in the parenthesis in the latter part mean the ratios of the weights of respective elements.

In an exemplary embodiment of the present specification, the catalyst for an oxychlorination process of hydrocarbons may have a diameter of 0.1 mm to 1.0 mm, preferably 0.1 mm to 0.5 mm, and more preferably 0.18 mm to 0.25 mm. When the catalyst diameter is less than 0.1 mm, a pressure drop phenomenon in a reactor significantly occurs, so that the conversion or reaction rate of the reactant may deteriorate. In contrast, when the catalyst diameter is more than 1.0 mm, a channeling phenomenon in which a reactant does not go through a catalyst layer may occur. The diameter of the catalyst may mean an average particle diameter of catalyst particles. The diameter of the catalyst may be measured by a method generally used in the art, and for example, diameters of two or more catalyst particles may be measured by using scanning electron microscopy (SEM) or transmission electron microscopy (TEM), and an average of the measured diameters of the particles may be calculated as an average particle diameter.

An exemplary embodiment of the present specification provides a method for preparing a catalyst for an oxychlorination process of hydrocarbons, the method including: preparing a carrier including cerium oxide ($CeO_2$); and supporting a catalyst material including iron (Fe) on the carrier.

In an exemplary embodiment of the present specification, the supporting of the catalyst material including iron (Fe) on the carrier may use an incipient wetness method and may also use other wetness methods. As the precipitation method, a coprecipitation method, a homogeneous precipitation method, a sequential precipitation method, or the like may be used. When a catalyst powder is prepared by the precipitation method, a catalyst in a powder state may be obtained and the proportion of the active material may be freely adjusted by simultaneously precipitating an active material and a carrier as constituent elements, and a catalyst powder which is excellent in stability may be prepared by strengthening the mutual bonding strength between the active material and the carrier.

In an exemplary embodiment of the present specification, the supporting of the catalyst material including iron (Fe) on the carrier may be performed by a method of putting the carrier into an aqueous precursor solution including an active material precursor including iron (Fe) and stirring the resulting solution.

In an exemplary embodiment of the present specification, the active material precursor may vary depending on the type of target material. For example, when the active material is copper, the active material precursor may be copper chloride dehydrate ($CuCl_2 \cdot 2H_2O$), and when the active material is iron (Fe), the active material precursor may be $Fe(NO_3)_3 \cdot 9H_2O$, and when the active material is potassium, the precursor may be potassium chloride (KCl), and when the active material is lanthanum, the precursor may be lanthanum chloride heptahydrate ($LaCl_3 \cdot 7H_2O$).

In an exemplary embodiment of the present specification, the stirring may be performed such that the aqueous precursor solution may be supported on the carrier well, and may be performed for 0.5 hour or more, preferably, 1 hour or more.

In an exemplary embodiment of the present specification, the method for preparing a catalyst for an oxychlorination process of hydrocarbons may include: drying a catalyst; and calcining the catalyst.

In an exemplary embodiment of the present specification, the drying of the catalyst is for evaporating moisture of the catalyst, and the method of drying the catalyst is not particularly limited as long as the method is generally used in the art to which the technology pertains. For example, the drying of the catalyst may be performed by a method of evaporating moisture using a rotary evaporator and drying the catalyst at a temperature of 100° C. for 10 hours or more.

In an exemplary embodiment of the present specification, the calcining of the catalyst is performed to remove a precursor material remaining in the catalyst after the supporting of the catalyst material, and a method of calcining the catalyst is not particularly limited as long as the method is generally used in the art to which the technology pertains, and may be performed at a temperature of 100° C. or more for 1 to 10 hours, for example. When the performance temperature and the performance time are satisfied, it is possible to effectively remove the precursor material, and to suppress a problem with deterioration in durability caused by the occurrence of phase change in carrier.

An exemplary embodiment of the present specification provides a method for preparing an oxychlorination compound of hydrocarbons, which is performed in the presence of the above-described catalyst for an oxychlorination process of hydrocarbons and includes an oxychlorination reaction of hydrocarbons. When the above-described catalyst for an oxychlorination process of hydrocarbons is applied, an amount of oxychlorination compound of hydrocarbons produced is increased and the reduction in activity of the catalyst is low. That is, the above-described catalyst for an oxychlorination process of hydrocarbons exhibits excellent activity even at low temperature, and thus has an advantage in that the catalyst is suitable for a low-temperature process.

In an exemplary embodiment of the present specification, the method for preparing an oxychlorination compound of hydrocarbons may be expressed as a 'process' in the present specification.

In an exemplary embodiment of the present specification, the fact that the method is performed in the presence of a catalyst for an oxychlorination process of hydrocarbons may mean inducing a reaction by allowing a reaction gas and the like to flow into a reactor in which a catalyst for an oxychlorination process of hydrocarbons is mounted.

In an exemplary embodiment of the present specification, the oxychlorination reaction of hydrocarbons means a reaction of substituting hydrogen of a hydrocarbon raw material gas with chlorine, and is the same as described above.

In an exemplary embodiment of the present specification, an inlet gas means a collection of gases flowing into a reactor, and is differentiated from an outlet gas discharged outside the reactor after the reaction.

In an exemplary embodiment of the present specification, the method for preparing an oxychlorination compound of hydrocarbons may be performed by bringing an inlet gas into contact with the above-described catalyst. A partial oxidation reaction of the hydrocarbons is performed by bringing an inlet gas including a hydrocarbon raw material gas and a hydrogen chloride gas into contact with a catalyst. The meaning of the contact may be explained by a catalyst theory. Specifically, a catalyst includes a certain active site or active center, and a catalytic action is performed at the active site or active center. While the inlet gas is brought into contact with the active site or active center, the catalytic reaction occurs. For example, there is a method of loading a catalyst into a reactor and circulating the inlet gas in the reactor.

In an exemplary embodiment of the present specification, the inlet gas may further include a hydrocarbon raw material gas, a hydrogen chloride gas, and an oxygen gas.

In an exemplary embodiment of the present specification, the hydrocarbon raw material gas is a gas including carbon and hydrogen, and means a gas which is a raw material for a target product. Examples thereof include: a straight-chained or branched saturated aliphatic hydrocarbon having 1 to 16 carbon atoms, such as methane, ethane, propane, butane, pentane, hexane, heptane, octane, nonane, and decane; an alicyclic saturated hydrocarbon, such as cyclohexane, methylcyclohexane, and cyclooctane; a monocyclic or polycyclic aromatic hydrocarbon; urban gas; LPG; naphtha; and a hydrocarbon such as kerosene.

In an exemplary embodiment of the present specification, the hydrogen chloride gas (HCl) may function as a supply source of chlorine atoms.

In an exemplary embodiment of the present specification, the inlet gas may further include one or two or more inert gases selected from the group consisting of nitrogen, helium, argon, and carbon dioxide.

In an exemplary embodiment of the present specification, the ratio of the volume flow rates of the hydrocarbon raw material gas to the hydrogen chloride gas may be 1:1 to 10:1, preferably 1:1 to 5:1, more preferably 1:1 to 3:1, and most preferably 1.5:1 to 2.5:1. When the ratio satisfies the numerical range, the excellent activity of the catalyst may be maintained. Accordingly, there is an advantage in that the selectivity of the target product may be maintained at a high level.

In an exemplary embodiment of the present specification, the inlet gas may further include an oxygen gas, and the ratio of the volume flow rates of the hydrocarbon raw material gas to the oxygen gas may be 1:1 to 10:1, preferably 2:1 to 6:1, and more preferably 3:1 to 5:1. When the ratio of the volume flow rates of the hydrocarbon raw material gas to the oxygen gas is less than 1:1, the selectivity of chloromethane as the target product may be decreased, and when the ratio of the volume flow rates of the hydrocarbon raw material gas to the oxygen gas is more than 10:1, there may be a problem in that the selectivity of byproducts such as carbon monoxide or carbon dioxide is increased.

In an exemplary embodiment of the present specification, the ratio of the volume flow rates of the hydrocarbon raw material gas to the inert gas may be 1:0.5 to 1:10, preferably 1:0.5 to 1:5.

The ratio of the volume flow rates may be measured by a method generally used in the art to which the technology pertains, and may be achieved by adjusting the temperature and pressure of an inlet gas flowing into a reactor. For example, the ratio of the volume flow rates may be measured at room temperature (25° C.) and normal pressure (1 atm), and may be measured by using a volumetric flow meter generally used in the art.

In an exemplary embodiment of the present specification, the process may be performed under a process temperature of 450° C. to 550° C., a pressure of 0.5 atm to 3 atm, and a space velocity of 2,000 $h^{-1}$ to 20,000 $h^{-1}$.

In an exemplary embodiment of the present specification, the process may be performed under a process temperature of 450° C. to 530° C., 450° C. or more and less than 530° C., 450° C. to 520° C., or 450° C. to 510° C. When the process temperature satisfies the range, it is possible to suppress byproducts from being produced and to increase the selectivity of a target product. For example, when the hydrocarbon raw material is methane, the process proceeds in the order of 1) the production of a Cl activated species through oxidation of hydrogen chloride, 2) the production of $CH_3Cl$ through reaction of methane and the Cl activated species, and 3) the production of byproducts such as carbon monoxide or carbon dioxide from the additional reaction of produced $CH_3Cl$ or the oxidation of methane. In this case, when the process temperature is low, the effect of the catalyst on the reaction is predominant, so that the rate of producing the Cl activated species in the reaction of 1) becomes faster than the rate of consuming the Cl activated species in the reaction of 2) through the oxidation-reduction ability of the catalyst itself. However, when the process temperature is high, the rate of the reaction of 3) becomes faster while the effect of temperature is gradually increased, so that there is a problem in that the production of byproducts is increased.

An exemplary embodiment of the present specification intends to suppress byproducts such as carbon monoxide or carbon dioxide from being produced by appropriately maintaining the rates of the reactions of 1) and 2) while controlling the rate of the above-described reaction of 3) by adjusting the process conditions as described above.

In an exemplary embodiment of the present specification, the space velocity of the inlet gas may be 10,000 ml/(h·gcat) to 50,000 ml/(h·gcat). When the space velocity of the inlet gas satisfies the range, the inlet gas is sufficiently fluid, so that it is possible to effectively suppress cokes from being generated.

In an exemplary embodiment of the present specification, the method for preparing an oxychlorination compound of hydrocarbons may be performed in a packed bed reactor, a fluidized bed reactor, or a circulating fluidized bed reactor.

In an exemplary embodiment of the present specification, the method for preparing an oxychlorination compound of hydrocarbons may further include a neutralization process. The neutralization process is a process for removing a hydrogen chloride gas included in a reactant. Specifically, the neutralization process may be performed by allowing the reactant to pass through a reactor loaded with a sodium carbonate bed. The neutralization process may produce 1 equivalent of a carbon dioxide gas and 2 equivalents of sodium chloride by allowing 1 equivalent of sodium carbonate and 2 equivalents of hydrogen chloride to react, and may be expressed by the following drawing.

$$Na_2CO_3(s) + 2HCl(g) \rightarrow 2NaCl(aq) + H_2O(l) + CO_2(g)$$

MODE FOR INVENTION

Hereinafter, the above-described contents will be described through Examples. However, the right scope of the present specification is not limited by the following Examples.

Example 1

A cerium oxide carrier ($CeO_2$) powder (3 g, from Rhodia®, surface area: 130 $m^2/g$ or more) was prepared as a carrier. Iron (Fe) as a catalyst material was supported on the $CeO_2$ carrier by following method. In this case, iron (III) nitrate nonahydrate($Fe(NO_3)_3 \cdot 9H_2O$) was used as an iron (Fe) precursor.

A precursor solution was prepared by weighing the calculated amount of the precursor and dissolving the precursor in distilled water, the cerium oxide carrier was produced in a powder state and then put into the precursor solution and stirred sufficiently for 1 hour, and then the iron was supported on the cerium oxide carrier by evaporating water using a rotary evaporator. Thereafter, a catalyst was prepared by drying the carrier at a temperature of 100° C. for about 12 hours or more, and then firing the dried carrier at a temperature of 600° C. for 6 hours.

In this case, the content of iron (Fe) was 1.5 wt % based on the total weight of the catalyst.

Example 2

A catalyst was prepared in the same manner as in Example 1, except that the content of iron was 3 wt % based on the total weight of the catalyst.

Example 3

A catalyst was prepared in the same manner as in Example 1, except that the content of iron was 4 wt % based on the total weight of the catalyst.

Example 4

A catalyst was prepared in the same manner as in Example 1, except that the content of iron was 6 wt % based on the total weight of the catalyst.

Comparative Example 1

A catalyst was prepared in the same manner as in Example 1, except that no other metals were supported. In this case, as the cerium oxide carrier ($CeO_2$) powder, the powder which is the same as that described in Example 1 was used.

Figure 1:
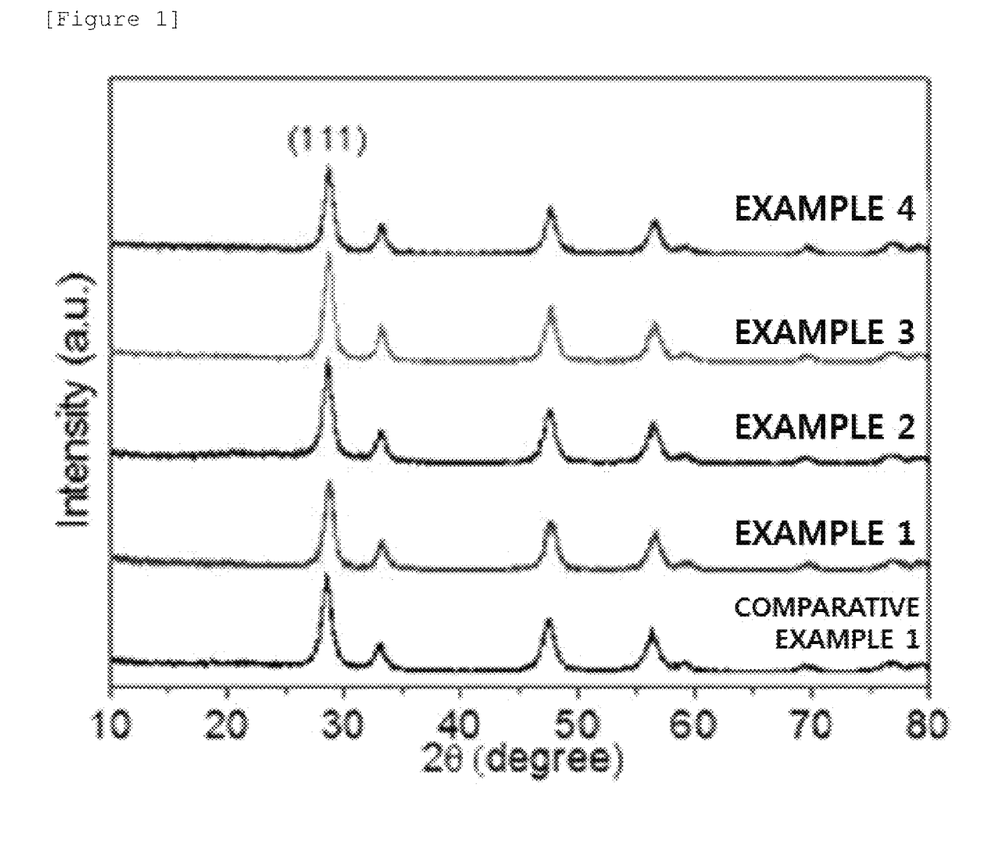
FIG. 1 illustrates XRD patterns of catalysts according to Examples 1 to 4 and Comparative Example 1.

FIG. 1 is a view according to the X-ray diffraction (XRD) of the catalysts according to Examples 1 to 4 and Comparative Example 1. The X-ray diffraction analysis may be measured under the measurement conditions of 40 kV and 30 mA by using the Ultra X18 (Rigaku Corp.). Cu K-alpha was used as a radiation source, and the X-ray diffraction analysis was measured at a scanning step of 0.02°.

Experimental Example 1: Experiment on Performance of Catalyst

Experiment Condition

The particle sizes of the catalysts prepared in the Examples and the Comparative Examples were adjusted by sieving to 180 μm to 250 μm.

Figure 6:
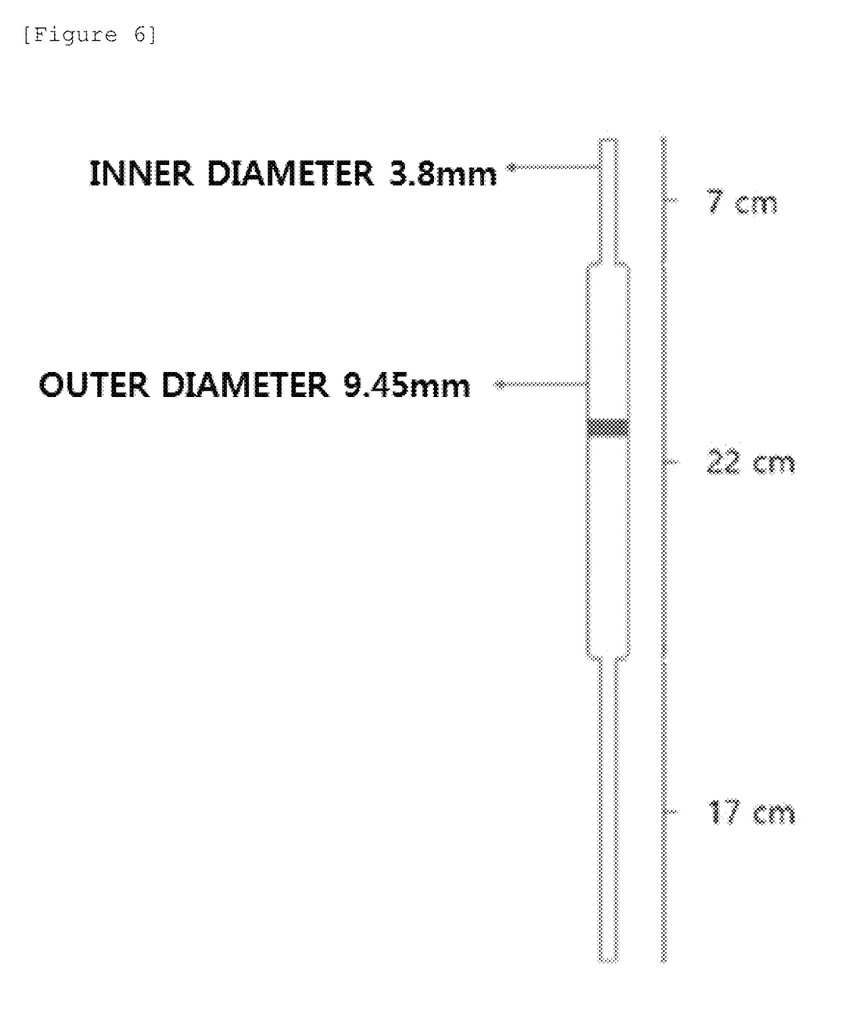
FIG. 6 illustrates a reactor used in Experimental Examples 1 to 3.

A packed bed reactor (PBR) formed of a quartz material as illustrated in FIG. 6 was applied to the experiment. The portion indicated with a blue color in the drawing was loaded with the catalysts according to the Examples and the Comparative Examples. The process temperature was adjusted by using a thermocouple provided outside the packed bed reactor.

The composition of the inlet gas was composed of a volume ratio of $CH_4:O_2:HCl:Ar:N_2=4:1:2:3:10$, and the volume flow rate of the inlet gas and the ratio $[F_T/W_{cat}]$ of flow rate/catalyst weight were adjusted to 50 ml/min and 30,000 ml/(h·$g_{cat}$), respectively, by adjusting the pressure in the reactor. The $CH_4:O_2:HCl$ are reactant gases, and the Ar acts as a diluent.

After all the gas conditions were completely set, an experiment was started after the reactor was pre-heated up to 450° C., and the composition of gas produced was monitored.

The concentration of gas produced was measured by a gas chromatograph (GC) downstream. The concentrations of $CH_4$, $CH_3Cl$, $CH_2Cl_2$, and $CHCl_3$ were measured by a flame ionization detector (FID), and the concentrations of $CH_4$, $N_2$, $O_2$, $CO_2$, and CO were measured by a thermal conductivity detector (TCD). In order to prevent the produced gas from being condensed, the produced gas may be heated up to 150° C.

The yield and selectivity related to the gas may be calculated by the following Mathematical Formulae 1 to 3. The correction factor (α) associated with the inlet and outlet nitrogen gas is calculated by the following Mathematical Formula 1.

$$\alpha = \frac{n(N_2)_{inlet}}{n(N_2)_{outlet}} \quad \text{[Mathematical Formula 1]}$$

The $n(N_2)_{inlet}$ is the number of moles of a nitrogen gas flowing into the reactor, and the $n(N_2)_{outlet}$ is the number of moles of a nitrogen gas flowing out of the reactor.

The methane conversion (X, %) is calculated by the following Mathematical Formula 2.

$$X(CH_4) = \quad \text{[Mathematical Formula 2]}$$
$$\frac{n(CH_4)_{inlet} - \alpha \times n(CH_4)_{outlet}}{n(CH_4)_{inlet}} \times 100(\%)$$

The $n(CH_4)_{inlet}$ is the number of moles of a methane gas flowing into the reactor, and the $n(CH_4)_{outlet}$ is the number of moles of a methane gas flowing out of the reactor.

The selectivity (S) of the gas produced is calculated by the following Mathematical Formula 3.

$$S(j) = \frac{n(j)_{outlet}}{\sum n(j)_{outlet}} \times 100(\%) \quad \text{[Mathematical Formula 3]}$$

The $n(j)_{outlet}$ is the number of moles of each produced gas flowing out of the reactor, and the $\Sigma n(j)_{outlet}$ is the total number of moles of the produced gases.

Figure 2:
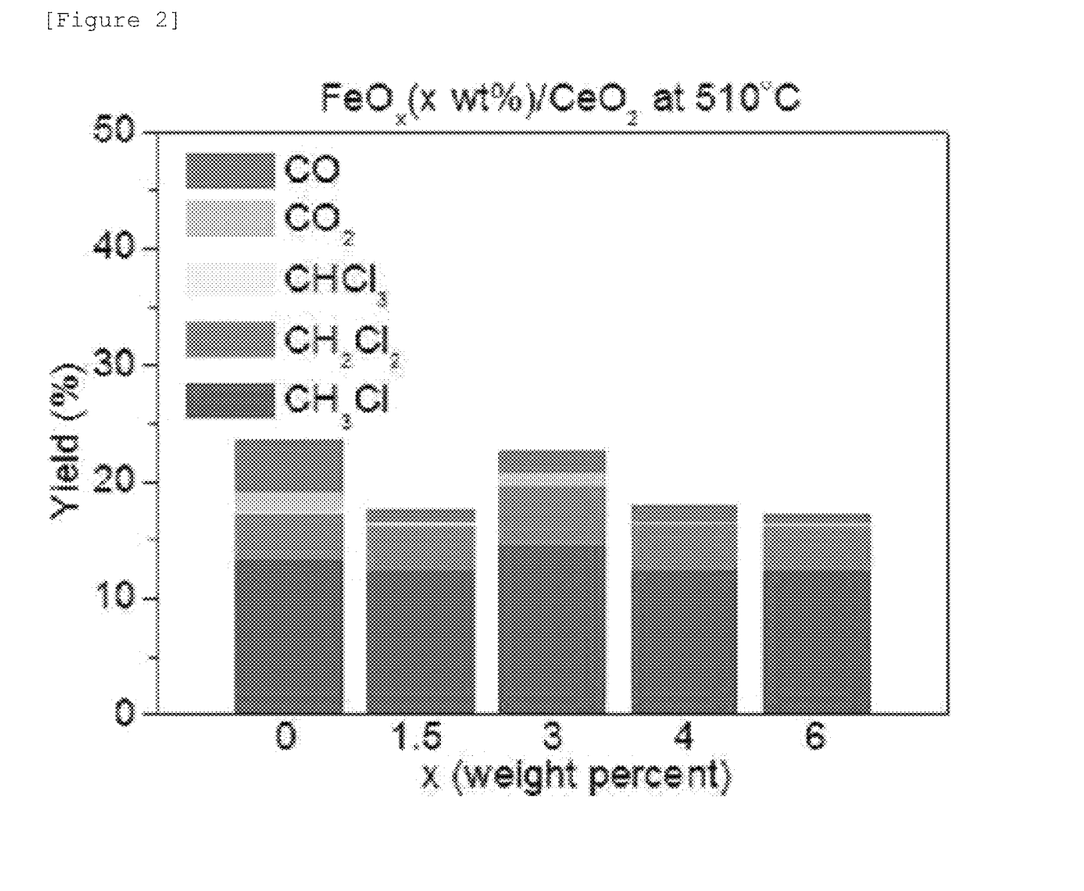
FIG. 2 illustrates experimental results according to Experimental Example 1.

In this case, the process temperature was 510° C., and the conversion of the reactant and the selectivity of the product are shown in the following Table 1 and FIG. 2.

TABLE 1

| Classification | Constitution/Type | | Example 1 | Example 2 | Example 3 | Example 4 | Comparative Example 1 |
|---|---|---|---|---|---|---|---|
| Type of catalyst | Supported material | | Fe | Fe | Fe | Fe | Not supported |
| | Carrier | | $CeO_2$ | $CeO_2$ | $CeO_2$ | $CeO_2$ | $CeO_2$ |
| | Amount (wt %) of iron supported | | 1.5 | 3 | 4 | 6 | 0 |
| Experimental Example 1 | Process temperature (° C.) | | 510 | 510 | 510 | 510 | 510 |
| | Methane conversion (%) | | 17.6 | 22.6 | 17.9 | 17.3 | 23.6 |
| | Selectivity (%) of produced gas | $CH_3Cl$ | 70.6 | 65.2 | 70.5 | 72.5 | 56.8 |
| | | $CH_2Cl_2$ | 22.1 | 22.0 | 21.7 | 21.8 | 17.2 |
| | | $CHCl_3$ | 0.9 | 0.4 | 0.7 | 1.0 | 0.3 |
| | | $CO_2$ | 1.6 | 4.6 | 0 | 0 | 7.2 |
| | | CO | 4.7 | 7.8 | 7.1 | 4.8 | 18.5 |
| Experimental Example 2 | Unit cell parameter[aa (Å)] | | 5.366 | 5.357 | 5.358 | 5.381 | 5.390 |

When Examples 1 to 4 and Comparative Example 1 are compared, it could be confirmed that the case where iron was supported on the carrier $CeO_2$ had lower selectivities of $CO_2$ and CO byproducts than those of the case where iron was not supported (Comparative Example 1). This is because the oxygen vacancy was enriched by the charge compensation mechanism while iron ions ($Fe^{3+}$) are incorporated into the lattice of $CeO_2$, and accordingly, the oxidation-reduction ability of the catalyst was enhanced. Meanwhile, when Examples 1 to 4 were compared, it could be confirmed that the conversion of methane and the selectivity of the byproduct were changed according to the amount of iron ions supported. In the case of Example 1 where the amount of iron supported was 1.5 wt % and Example 4 where the amount of iron supported was more than 3 wt %, the conversion of methane was about 17.3%. However, in the case of Example 2 where the amount of iron supported was 3 wt %, the conversion of methane was 22.6%, and the highest conversion could be achieved. This is because as the amount of iron supported was increased, the oxidation-reduction ability of the catalyst caused by iron could be enhanced, but when a too large amount of iron was supported, iron particles aggregate, and the oxygen vacancy was decreased by the interstitial compensation mechanism.

That is, when iron (Fe) was supported on the $CeO_2$ carrier, the selectivity of the byproduct could be decreased while the selectivity of the chlorination compound was increased. In particular, the catalysts according to Examples 2 and 3 exhibited the best performance.

Figure 5:
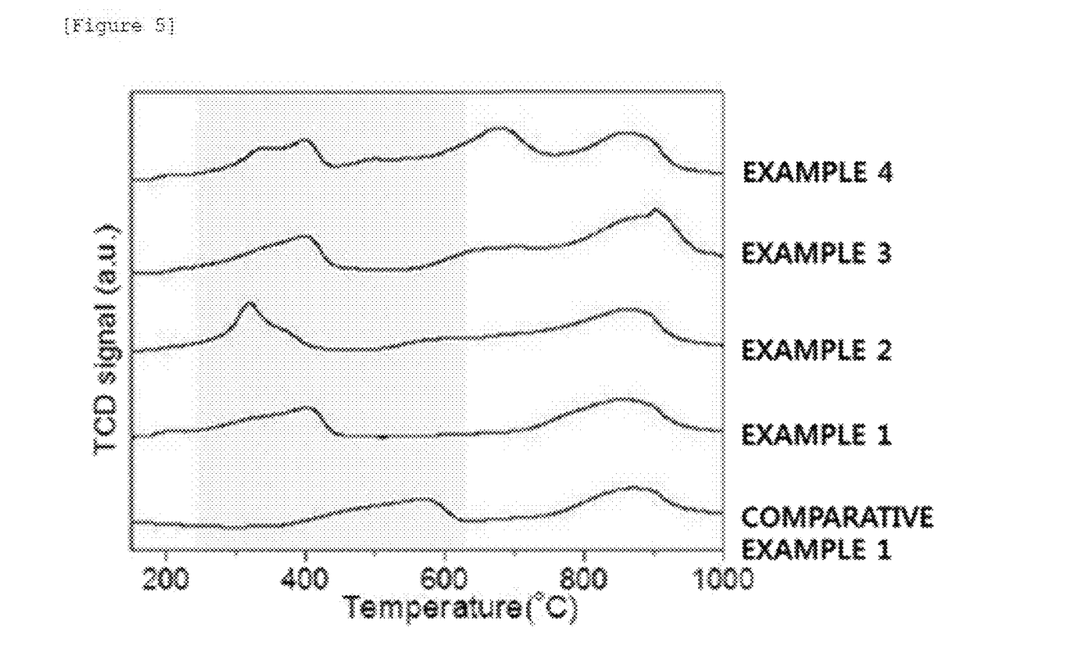
FIG. 5 illustrates $H_2$-TPR experimental results according to Experimental Example 2.

Experimental Example 2: Experiment on Change in Reduction Characteristic of Catalyst In order to observe the change in reduction property of a catalyst according to the content of iron, an $H_2$-TPr analysis ($H_2$—Temperature Programmed Reduction, using BEL CAT II manufactured by MicrotracBEL Corp.) and an XRD diffraction analysis were performed. The catalysts according to Comparative Example 1 and Examples 1 to 4 were pre-treated while being heated up to 400° C. at a heating rate of 10° C./min under the air condition, and then cooled down to 40° C. Thereafter, the catalysts were heated up to 900° C. at a rate of 10° C./min by utilizing a 5% $H_2/N_2$ mixed gas, and the $H_2$-TPR analysis was performed. Specifically, the catalysts were reduced while being heated up to 900° C. at a heating rate of 10° C./min under a 5% $H_2$/Ar condition. The results are illustrated in FIG. 5, and an XRD diffraction analysis was performed and the results thereof are shown in Table 1.

Further, when Examples 1 to 4 are compared, it could be confirmed that the catalyst in Example 2 exhibited the strongest interaction. Through the confirmation, it could be confirmed that the oxygen vacancy occurring in the catalyst could be changed according the amount of iron supported, and accordingly, the degree of interaction between iron and the carrier was changed.

It could be confirmed that as the amount of iron supported was increased to 0 to 3 wt % (Comparative Example 1 and Examples 1 and 2), the unit cell lattice parameter was decreased. This is because the cell shrinkage occurs as iron ions ($Fe^{3+}$, 0.64 Å) having small particle sizes are incorporated into the carrier $CeO_2$ while substituting cerium ions ($Ce^{4+}$, 1.01 Å) of the carrier $CeO_2$. The reason why the cell shrinkage occurs is that iron and Ce of the carrier interact well with each other, and as a result, an Fe—Ce solid solution is produced. From the result, it could be confirmed that the catalyst in Example 2 in which the iron content was 3 wt % had the highest degree of interaction between iron and Ce of the carrier.

Meanwhile, it could be confirmed that in the case of Examples 3 and 4 where the content of iron was 4 wt % or more, the unit cell lattice parameter was rather increased when the content of iron was increased. This is because an aggregation phenomenon of iron particles occurred as the amount of iron was increased, and the amount of Fe forming a solid solution with Ce was decreased.

As a result of the $H_2$-TPR analysis, the case where a reduction peak appears at low temperature means that the oxidation-reduction ability of the catalyst is good. As the amount of iron supported is increased to 0 to 3 wt % (Comparative Example 1 and Examples 1 and 2), the temperature at which the reduction peak appears tends to be lowered.

It may be explained that the tendency is caused by the difference in concentration of the oxygen vacancy generated by the charge compensation mechanism caused by the difference in oxidation number between $Fe^{3+}$ and $Ce^{4+}$ of the Fe—Ce solid solution. That is, the production degree of the Fe—Ce solid solution and the concentration of the oxygen vacancy are in a proportional relationship. Further, when the oxygen vacancy occurs, the interaction between the catalyst material and the carrier is strengthened, and as a result, the oxidation-reduction ability of the catalyst may be excellent.

It could be confirmed that as the amount of iron supported was increased to 0 to 3 wt % (Comparative Example 1 and Examples 1 and 2), the concentration of the Fe—Ce solid solution was increased, and the catalyst in Example 2 had the largest amount of oxygen vacancies.

In the catalyst in Comparative Example 1 in which iron was not supported, a carrier reduction peak appeared at the highest temperature, and in the catalyst in Example 2 in which the content of iron was 3 wt %, a carrier reduction peak appeared at the lowest temperature of 320° C. The appearance of these peaks is a phenomenon occurring when the interaction between iron and the carrier is strong, and it could be confirmed that the catalyst in Example 2 in which the content of iron was 3 wt % exhibited the strongest interaction.

Experimental Example 3: Experiment According to Process Temperature

Figure 3:
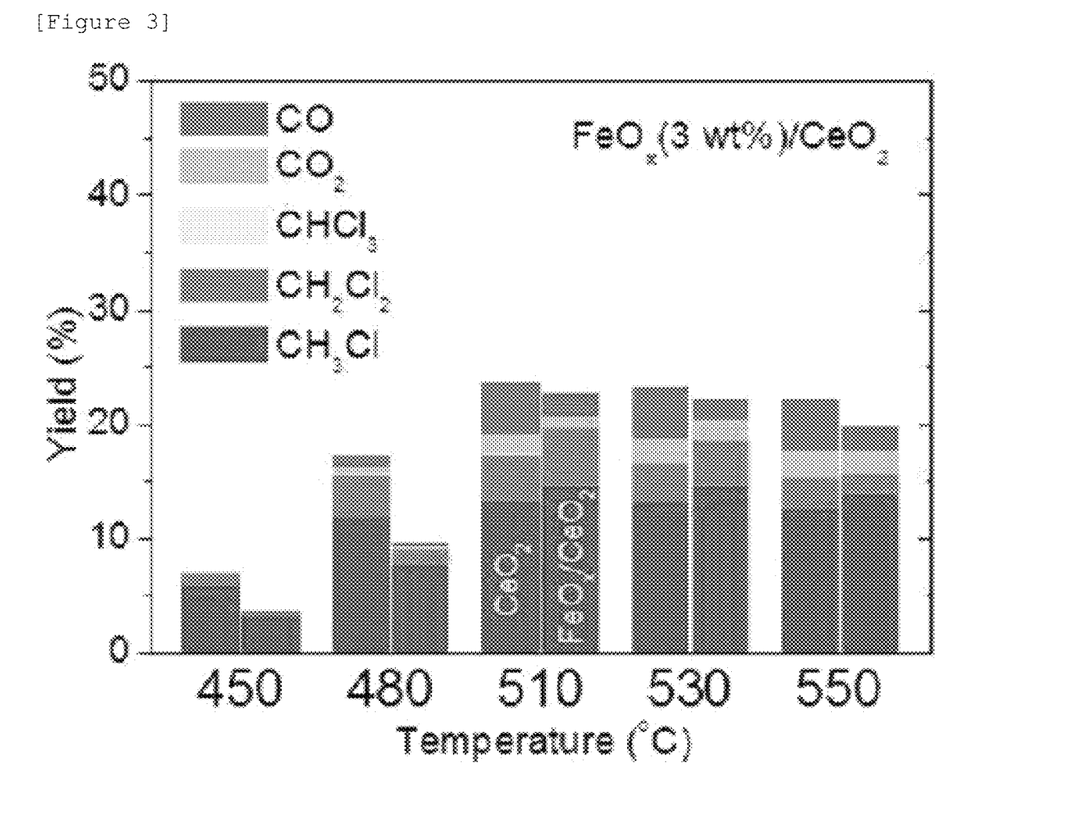
FIGS. 3 and 4 illustrate experimental results according to Experimental Example 3.
Figure 4:
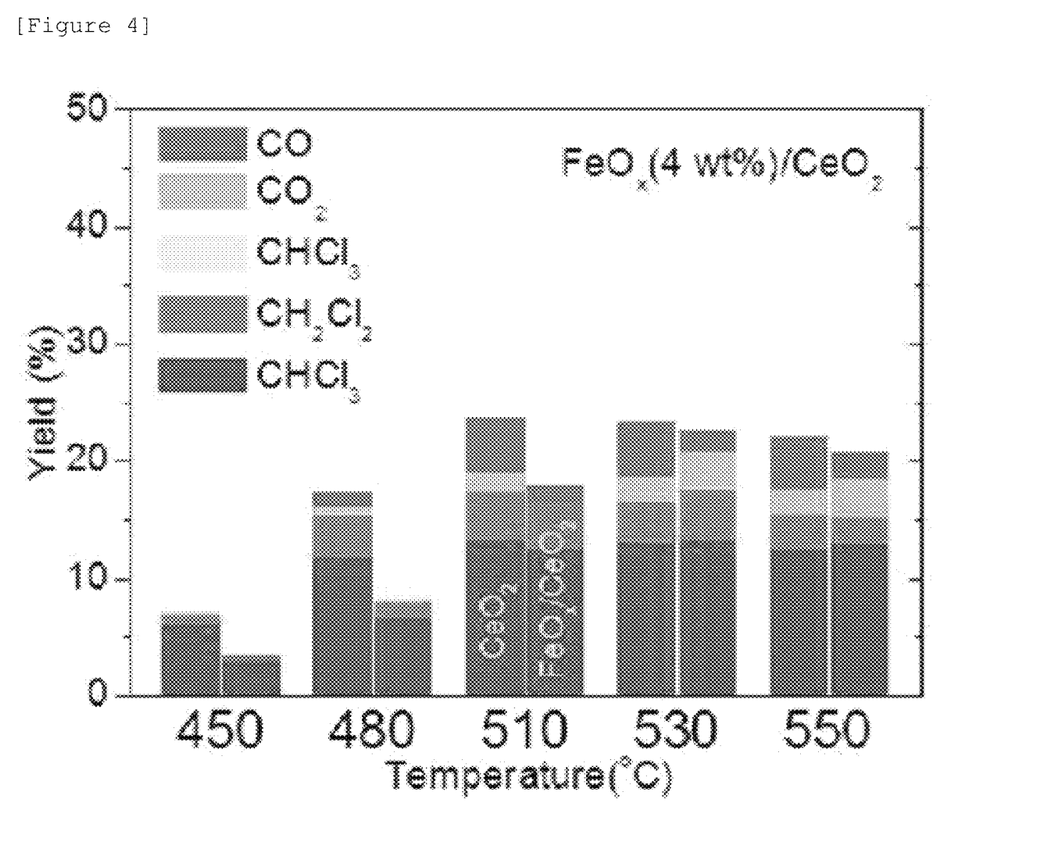

In order to compare the effects according to the process temperature, experiments were performed by applying the catalysts according to Examples 2 and 3. The conversion or selectivity of the material is shown in the following Table 2 and FIGS. 3 and 4. FIGS. 3 and 4 illustrate the results of the experiments to which the catalysts according to Examples 2 and 3 are applied, respectively.

TABLE 2

| Temperature (° C.) | Conversion of methane Example | | Selectivity of $CH_3Cl$ Example | | Selectivity of $CH_2Cl_2$ Example | | Selectivity of $CHCl_3$ Example | | Selectivity of $CO_2$ Example | | Selectivity of CO Example | |
|---|---|---|---|---|---|---|---|---|---|---|---|---|
| Classification | 2 | 3 | 2 | 3 | 2 | 3 | 2 | 3 | 2 | 3 | 2 | 3 |
| 450 | 3.6% | 3.3% | 92.7% | 90.6% | 7.3% | 9.4% | 0% | 0% | 0% | 0% | 0% | 0% |
| 480 | 9.6% | 8.2% | 81.% | 82.0% | 15.2% | 17.0% | 0.9% | 1.0% | 0% | 0% | 2.1% | 2.1% |
| 510 | 22.6% | 17.9% | 65.2% | 70.5% | 22.0% | 21.7% | 0.4% | 0.7% | 4.6% | 0% | 7.8% | 7.1% |
| 530 | 22.1% | 22.6% | 66.8% | 59.3% | 17.4% | 19.2% | 0.1% | 0.3% | 8.6% | 14.1% | 7.2% | 7.1% |
| 550 | 19.8% | 20.7 | 70.5% | 62.7 | 9.6% | 11.7% | 0% | 0% | 9.9% | 15.3 | 9.9% | 10.3 |

According to Example 7, it could be confirmed that when the process temperature was more than 530° C., lots of carbon dioxide and carbon monoxide as byproducts were produced. The results as described above are due to the fact that when the process temperature was more than 530° C., the effect of temperature during the process was increased, and as a result, the produced $CH_3Cl$ additionally reacted or $CH_4$ was directly oxidized to produce large amounts of carbon dioxide and carbon monoxide as byproducts. In contrast, when the process temperature was 530° C. or less, it was possible to prevent carbon dioxide and carbon monoxide as byproducts from being produced by suppressing $CH_3Cl$ from additionally reacting, or suppressing $CH_4$ from being directly oxidized.

From the aforementioned results, it could be confirmed that the catalyst according to an exemplary embodiment of the present specification exhibited excellent activity even at a low temperature of 530° C. or less.

The invention claimed is:

1. A catalyst for an oxychlorination process of hydrocarbons, the catalyst comprising:
    a catalyst material comprising iron from a $F(NO_3)_3 \cdot 9H_2O$ precursor; and
    a carrier consisting of $CeO_2$,
    wherein the carrier has a specific surface area of 120 m²/g to 150 m²/g;
    wherein a content of the catalyst material is 3 wt % to 4 wt % based on a total weight of the catalyst,
    wherein the catalyst is prepared by dissolving the $Fe(NO_3)_3 \cdot 9H_2O$ precursor in water, adding the carrier, mixing, evaporating the water, and drying to provide the catalyst,
    wherein the catalyst is in the form of particles having a diameter of 0.18 mm to 0.25 mm, and
    wherein a content of the iron in the catalyst material is 100 wt % based on a total weight of the catalyst material.

2. The catalyst according to claim 1, wherein the carrier has a specific surface area of 130 m²/g to 150 m²/g.

3. The catalyst according to claim 1, wherein the content of the catalyst material is 3 wt % to 3.5 wt % based on a total weight of the catalyst.

4. A method for preparing the catalyst for an oxychlorination process of hydrocarbons according to claim 1, the method comprising:
    preparing the carrier consisting of $CeO_2$; and
    supporting the catalyst material comprising iron from a $Fe(NO_3)_3 \cdot 9H_2O$ precursor on the carrier.

5. The method according to claim 4, wherein the carrier has a specific surface area of 130 m²/g.

6. The method according to claim 4, wherein the content of the catalyst material is 3 wt % based on a total weight of the catalyst.

7. The method according to claim 4, wherein the content of the catalyst material is 3.5 wt % based on a total weight of the catalyst.

8. The method according to claim 4, wherein the content of the catalyst material is 4 wt % based on a total weight of the catalyst.

9. A method for preparing an oxychlorination compound of hydrocarbons, comprising:
    performing an oxychlorination reaction of hydrocarbons in the presence of the catalyst according to claim 1.

10. The method of claim 9, wherein the method is performed under a process temperature of 450° C. to 550° C., a pressure of 0.5 atm to 3 atm, and a space velocity of 2,000 h$^{-1}$ to 20,000 h$^{-1}$.

11. The method of claim 10, wherein the process temperature is 450° C. to 530° C.

12. The method of claim 9, wherein the method is performed in a packed bed reactor, a fluidized bed reactor, or a circulating fluidized bed reactor.

* * * * *